United States Patent
Wranne

(10) Patent No.: US 11,908,206 B2
(45) Date of Patent: Feb. 20, 2024

(54) COMPENSATION FOR VERTICAL ROAD CURVATURE IN ROAD GEOMETRY ESTIMATION

(71) Applicant: ZENUITY AB, Gothenburg (SE)

(72) Inventor: Staffan Wranne, Pixbo (SE)

(73) Assignee: Zenuity AB, Gothenburg (SE)

( * ) Notice: Subject to any disclaimer, the term of this patent is extended or adjusted under 35 U.S.C. 154(b) by 363 days.

(21) Appl. No.: 17/183,792

(22) Filed: Feb. 24, 2021

(65) Prior Publication Data

US 2021/0264170 A1    Aug. 26, 2021

(30) Foreign Application Priority Data

Feb. 25, 2020 (EP) ..................................... 20159205

(51) Int. Cl.
*G06V 20/56* (2022.01)

(52) U.S. Cl.
CPC .................................. *G06V 20/588* (2022.01)

(58) Field of Classification Search
CPC ...... G06V 20/588; G06T 7/579; B60W 40/06; B60W 2420/403; B60W 2520/10; B60W 2520/105; B60W 2552/00; B60W 2552/53
See application file for complete search history.

(56) References Cited

U.S. PATENT DOCUMENTS

| | | | | |
|---|---|---|---|---|
| 2015/0302586 A1* | 10/2015 | Fukata | .................... | G08G 1/167 382/103 |
| 2017/0010618 A1* | 1/2017 | Shashua | .................. | G01C 21/14 |
| 2018/0023961 A1* | 1/2018 | Fridman | .................. | G06V 20/56 382/104 |
| 2018/0024562 A1* | 1/2018 | Bellaiche | .............. | G01S 13/867 701/26 |
| 2018/0257660 A1* | 9/2018 | Ibrahim | ................. | G01S 5/0027 |
| 2021/0264170 A1* | 8/2021 | Wranne | ................. | G06V 20/588 |

OTHER PUBLICATIONS

Extended European Search Report dated Sep. 2, 202 for European Patent Application No. 20159205.2, 8 pages.

(Continued)

*Primary Examiner* — Md K Talukder
(74) *Attorney, Agent, or Firm* — Sage Patent Group

(57) ABSTRACT

Method for estimating a vertical offset of road segment for vehicle is disclosed. The method includes tracking road reference on road segment at first moment in time from first observation point in order to form first representation. Method includes obtaining vehicle movement data over time period extending from first moment in time to second moment in time, tracking road reference on road segment at second moment in time from second observation point in order to form second representation. Method includes transforming point of first representation from coordinate system of first representation to coordinate system of second representation based on obtained movement data, applying vertical coordinate on transformed point to calculate set of projected longitudinal and lateral coordinates that satisfy defined mathematical function and maximum error value, determining vertical offset based on applied vertical coordinate that satisfied defined mathematical function with maximum error value and on obtained vehicle movement data.

15 Claims, 5 Drawing Sheets

(56) References Cited

OTHER PUBLICATIONS

Ernst D. Dickmanns et al.; "Recursive 3-D Road and Relative Ego-State Recognition"; IEEE Transactions on Pattern Analysis and Machine Intelligence, vol. 14, No. 2; Feb. 1992; pp. 199-213 (15 pages).

Hiroyuki Uchiyama et al.; "3-D Line Segment Reconstruction using an In-Vehicle Camera for Free Space Detection"; 2011 IEEE Intelligent Vehicles Symposium (IV), Baden-Baden, Germany; Jun. 5-9, 2011; pp. 290-295 (6 pages).

F. Mai et al.; "3D Curves Reconstruction from Multiple Images"; 2010 IEEE International Conference on Digital Image Computing: Techniques and Applications (DICTA); Piscataway, NJ, USA; Dec. 1, 2010; pp. 462-467 (6 pages).

\* cited by examiner

COMPENSATION FOR VERTICAL ROAD CURVATURE IN ROAD GEOMETRY ESTIMATION

CROSS-REFERENCE TO RELATED APPLICATIONS

The present application for patent claims priority to European Patent Office Application Ser. No. 20159205.2, entitled "COMPENSATION FOR VERTICAL ROAD CURVATURE IN ROAD GEOMETRY ESTIMATION" filed on Feb. 25, 2020, assigned to the assignee hereof, and expressly incorporated herein by reference.

TECHNICAL FIELD OF THE INVENTION

The present disclosure relates to advanced driver assistance systems (ADAS) and autonomous driving (AD). More specifically, the present disclosure relates to road modelling in the form of road geometry estimation.

BACKGROUND

During these last few years, the development of autonomous vehicles has exploded and many different solutions are being explored. Today, development is ongoing in both autonomous driving (AD) and advanced driver-assistance systems (ADAS), i.e. semiautonomous driving, within a number of different technical areas within these fields. AD and ADAS may also be referred to as Automated Drive Systems (ADS) with different levels, where AD is commonly classified as ADS of level 3 or higher as defined by SAE J3016, while ADAS is commonly classified as ADS of level 2 or lower as defined by SAE J3016. One such area is how to estimate the vehicle's position and orientation with accuracy and consistency since this is an important safety aspect when the vehicle is moving within traffic.

Road departures are a critical issue in both AD and ADAS systems and proper solutions to mitigate the risk of road departures are of utmost importance, moreover, road departure interventions are a part of EuroNCAP Lane Support System (LSS) rating. Generally, lane support systems may be classified in three subcategories Lane Departure Warning (LDW), Lane Keep Assist (LKA), and Lane Centering Assist (LCA) which are designed to assist and/or warn drivers when one unintentionally leaves the road lane or when one changes lanes without indication.

However, for all lane support systems or any other steering system, precise and reliable detection of the road geometry is a key function. In particular, such systems rely upon precise and reliable lane marker or road edge tracking. In general, the lane marker and road edge tracking features detect lane markers (or other road references) from images captured by one or more cameras mounted on the vehicle. Then, based upon this detection, a mathematical representation of the geometrical shape or position of the lane markers or road edge(s) is computed and a road model (including a lane geometry) of the travelled upon road segment can be determined.

However, driving on a non-flat surface, such as e.g. on roads with dips and crests, can cause the lane tracking estimation to bend inwards or outwards due to an inaccurate image projection resulting in an inaccurate road geometry information when generating the mathematical representation. Consequently, this image distortion can cause one or more lane support systems to make erroneous conclusions of the road ahead. In more detail, lane tracking estimations bending inwards tend to suppress the lane keeping functionality because of the tapering line representation. Analogously, lane tracking estimations bending outwards will also negatively affect the lane keeping functionality, albeit in an opposite manner, i.e. the lane keeping functionality will assume that there is more space between the lane lines than is true.

Not only is there a safety risk involved with unreliable lane tracking functions, but the user experience is also impaired. In view of upcoming stricter requirements for Lane Support Systems, and the general objective in the automotive industry for providing reliable and cost effective solutions there is a need for new and improved solutions which mitigate the problems associated with currently known systems, and preferably without increasing costs.

More specifically, there is a need for a solution, which at least partly solves the problems associated with image distortion cause by vertical road curvatures in lane tracking features.

SUMMARY OF THE INVENTION

It is therefore an object of the present disclosure to provide a method for estimating a vertical offset of a road segment for a vehicle, a corresponding computer-readable storage medium, control device, and a vehicle comprising such a control device, which alleviate all or at least some of the drawbacks of presently known system.

More specifically, it is an object of the present disclosure to provide a solution for estimating a vertical offset (and optionally a vertical curvature) of a road portion in front of a vehicle in an accurate, reliable and cost-effective manner.

This object is achieved by means of a method, a computer-readable storage medium, a control device, and a vehicle as defined in the appended claims. The term exemplary is in the present context to be understood as serving as an instance, example or illustration.

According to a first aspect of the present disclosure, there is provided a method for estimating a vertical offset of a road segment for a vehicle. The method comprises tracking at least one road reference on the road segment at a first moment in time from a first observation point in order to form a first representation of the at least one road reference in a vehicle plane. The first representation is based on a first mathematical function. The method further comprises obtaining vehicle movement data over a time period extending from the first moment in time to a second moment in time, and tracking the at least one road reference on the road segment at the second moment in time from a second observation point in order to form a second representation of the at least one road reference in the vehicle plane. The second representation is based on a second mathematical function. Further, the method comprises transforming a point of the first representation from a coordinate system of the first representation to a coordinate system of the second representation based on the obtained movement data, applying a vertical coordinate on the transformed point so to calculate a set of projected longitudinal and lateral coordinates that satisfy the defined mathematical function and a maximum error value, and determining the vertical offset based on the applied vertical coordinate that satisfied the second mathematical function with the maximum error value and on the obtained vehicle movement data. The determined vertical offset may advantageously be utilized in an Automated Driving System (ADS) feature of the vehicle, such as e.g. a path planning feature or a Lane Support System (LSS) feature. More specifically, the determined vertical offset may be used for improving the accuracy of road model estimations (e.g. lane marker modelling) which are utilized in the aforementioned ADS features.

The vehicle plane may in the present context be understood as the reference plane for the vehicle's local coordinate system. Moreover, the first and second mathematical functions may technically be the same or different types of functions (e.g. third order polynomials) where the first and second terminology are mainly used to elucidate the fact that they form two separate representations in two separate image frames.

In accordance with an exemplary embodiment, the method further comprises forming an updated representation of the one or more road references based on the determined vertical offset. In other words, the method may further comprise using the determined vertical offset in order to compensate for the distortion in the image captured by the image sensor causing an erroneous road reference representation (e.g. a lane trace).

According to a second aspect of the present disclosure, there is provided a (non-transitory) computer-readable storage medium storing one or more programs configured to be executed by one or more processors of a processing system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with another aspect of the present disclosure, there is provided a control device for estimating a vertical offset of a road segment for a vehicle. The control device comprises control circuitry configured to track a road reference on the road segment by means of an image sensor at a first moment in time from a first observation point in order to form a first representation of the road reference in a vehicle plane, where the first representation is based on a first mathematical function. The control circuitry is further configured to obtain vehicle movement data from at least one motion sensor of the vehicle over a time period extending from the first moment in time to a second moment in time, and track the road reference on the road segment by means of the image sensor at the second moment in time from a second observation point in order to form a second representation of the road reference in the vehicle plane, where the second representation is based on a second mathematical function. Moreover, the control circuitry is configured to transform a point of the first representation from a coordinate system of the first representation to a coordinate system of the second representation based on the obtained movement data, apply a vertical coordinate on the transformed point so to calculate a set of projected longitudinal and lateral coordinates that satisfy the defined mathematical function and a maximum error value, and determine the vertical offset based on the applied vertical coordinate that satisfied the second mathematical function and the maximum error value and on the obtained vehicle movement data. With this aspect of the disclosure, similar advantages and preferred features are present as in the previously discussed first aspect of the disclosure.

In accordance with yet another aspect of the present disclosure there is provided a vehicle comprising an image sensor, at least one motion sensor, and a control device according to any one of the embodiments disclosed herein. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
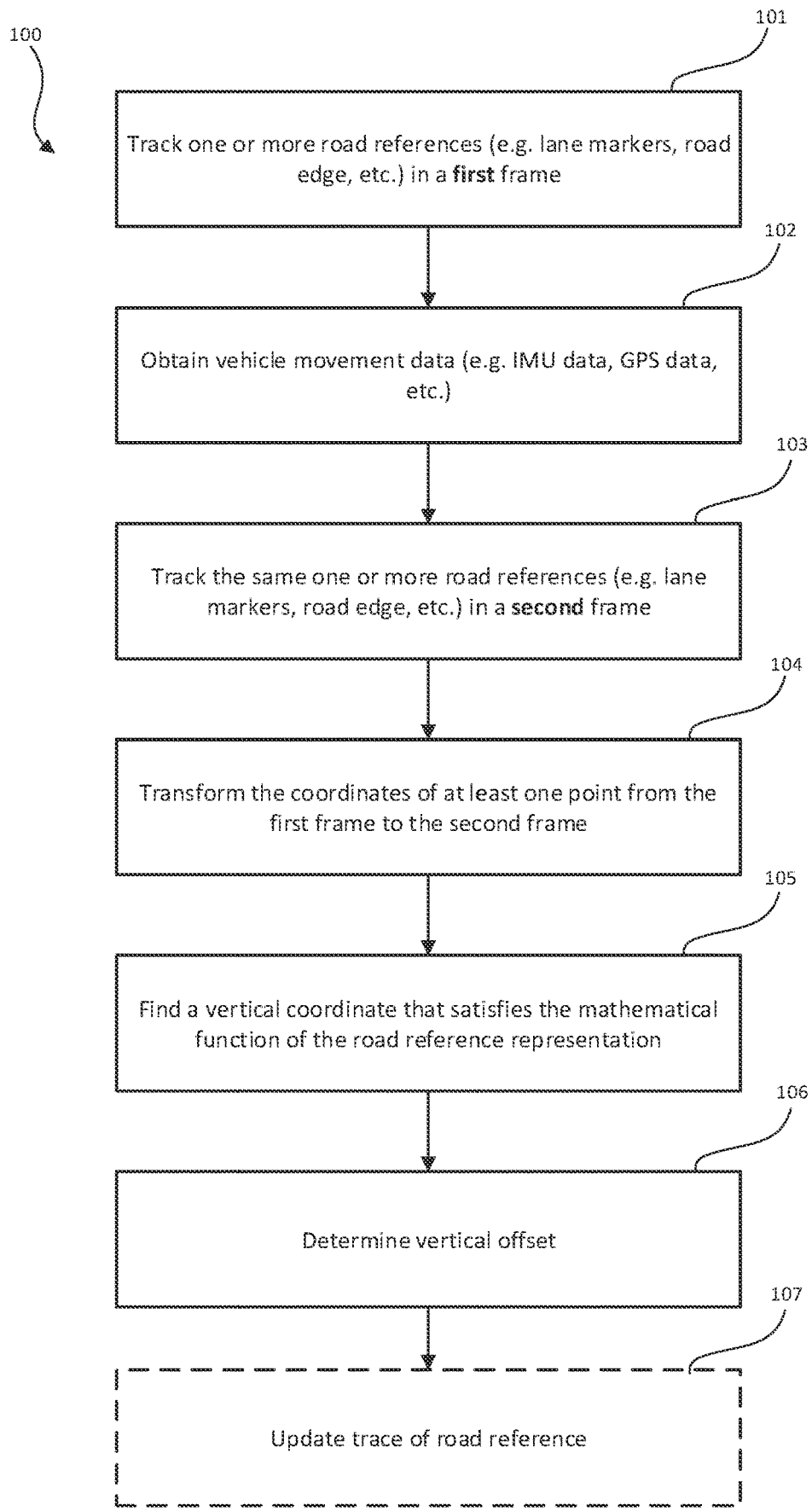
FIG. 1 is a schematic flow chart representation of a method for estimating a vertical offset of a road segment for a vehicle in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 shows a schematic flow chart representation of a method 100 for estimating or determining a vertical offset of a road segment for a vehicle traveling on the road segment. The determined vertical offset is advantageously utilized in an ADS feature of the vehicle. The ADS feature may be any feature of the vehicle, which utilizes lane traces, road edge traces or the like, such as e.g. a Lane Keeping Assist (LKA) feature, a Lane Departure Warning (LDW) feature, or any other Autonomous Driving (AD) feature such as a path planning module. A vertical offset is in the present context to be understood as a height difference between the road segment and a reference plane or vehicle plane (e.g. the surface plane that the vehicle is "standing" upon in the vehicle's local coordinate system). In other words, the vertical offset may be in the form of a height of an inclination in the road relative to the reference plane, or a depth of a dip or declination in the road relative to the reference plane.

The method 100 comprises tracking 101 one or more road references at a first moment in time (Li) from a first observation point in order to form a first representation of the one or more road references in a vehicle plane. This first representation is based on a first mathematical function, generally in the form of a third order polynomial, but other mathematical functions describing the distribution of the tracked road reference on the vehicle plane are feasible. Thus, the representation can be defined as a function $Y(x)_{t-1}$, such that each point of the representation has an x-coordinate, and a y-coordinate.

The road reference may for example be lane markers, a road edge, side posts, a road barrier, and so forth. The observation point may be represented by the position of the vehicle-mounted sensor (e.g. camera).

Further, the method 100 comprises obtaining 102 vehicle movement data over a time period extending (at least) from a first moment in time (t−1) to a second moment in time (t0). The vehicle movement data may for example be IMU data obtained from an Inertial Measurement Unit (IMU) of the vehicle, localization data obtained from a Global Navigation Satellite System (GNSS) of the vehicle, or any other vehicle-mounted sensor for monitoring an acceleration or position of the vehicle. Thus, the vehicle movement data may comprise one or more of a vehicle speed, a vehicle acceleration, a vehicle yaw rate, a vehicle pitch rate, and a vehicle roll rate.

The method 100 further comprises tracking 103 the one or more references (i.e. the same reference(s)) on the road segment at the second moment in time (t0) from a second observation point in order to form a second representation of the one or more road references in the vehicle plane. The second representation is also based on a second mathematical function, e.g. a third order polynomial $Y(x)_{t0}$.

In other words, the method 100 comprises tracking 101 one or more road references in a first frame (i.e. at the first moment in time), tracking 103 the same road reference(s) in a second frame (i.e. at a second moment in time), while obtaining 102 data indicative of how the vehicle has moved between these two frames. It should be noted that the first and second frames do not need to be two immediately subsequent frames (i.e. two consecutive frames) as long as the second frame is a frame obtained at a subsequent moment in time from the first frame, where the time between the two frames may be arbitrarily selected. For example, in a series of 10 frames, where the first frame is the first frame of the series while the second frame may be the second frame of the series, the third frame of the series, the fourth frame of the series, etc. As the skilled person in the art realizes the time between the two frames should not be too long as it would impact the accuracy of the solution disclosed herein, and may for example be less than 500 ms.

Moving on, the method 100 comprises transforming 104 the coordinates of an arbitrarily selected point of the first representation of the road reference from a coordinate system of the first representation to a coordinate system of the second representation based on the obtained movement data. Stated differently, one can construe this step as defining the first representation (e.g. lane trace) in the second frame and then arbitrarily selecting a point of this first representation in the second frame.

Figure 2:
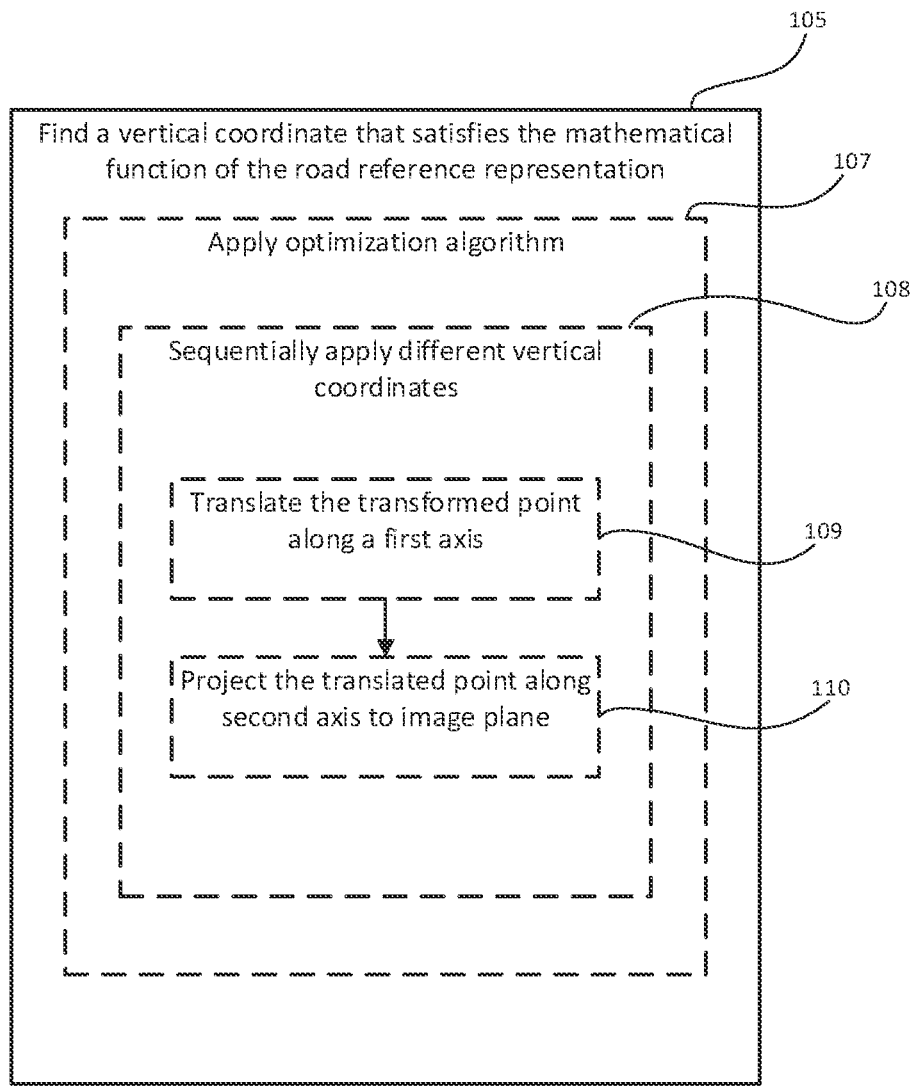
FIG. 2 is a schematic flow chart representation of sub-processes in a method for estimating a vertical offset of a road segment for a vehicle in accordance with an embodiment of the present disclosure.

Next, a vertical coordinate is applied 105 on the transformed point so to calculate a set of projected longitudinal and lateral coordinates that satisfy the second mathematical function and a maximum error value. This step will be described in more detail in reference to FIG. 2 in the following.

Accordingly, in some embodiments, the step of applying 105 a vertical coordinate comprises testing various vertical coordinates in order to translate 109 the transformed point along a first axis (which extends through the first observation point and the arbitrarily selected point in the first representation) in the coordinate system of the second representation (i.e. in the second frame. From the translated point, one can calculate a projected longitudinal coordinate $(x_{proj})$ and a projected lateral coordinate $(y_{proj})$.

In more detail, for each "tested" vertical coordinate, i.e. for each step along the first axis, the translated 109 point is projected along a second axis (extending through the second observation point and the translated 109 point) onto the vehicle plane in order to derive the projected longitudinal and lateral coordinates $(x_{proj}, y_{proj})$. The projected coordinates $(x_{proj}, y_{proj})$ are then used to see if they satisfy the second mathematical function in the second frame (describing the tracked road reference(s)), and more specifically they are used to see if they satisfy the second mathematical function well enough (error value is below the maximum error value).

More illustratively, if the second representation is described by a function $Y(x)_{t0}=y$, i.e. for each longitudinal coordinate x, there is a corresponding lateral coordinate y. Thus, in order to see if the projected coordinates $(x_{proj}, y_{proj})$ satisfy the mathematical function one uses e.g. the projected longitudinal coordinate $(x_{proj})$ as input $Y(x_{proj})_{t0}$ in order to obtain an output $Y(x_{proj})=y_{test}$. This output $y_{test}$ is then compared with the projected lateral coordinate $y_{test}-y_{proj}=e$, and the resulting error value (e) is checked against the maximum error value $(e_{max})$, such that if $e<e_{max}$, the mathematical function is considered to be satisfied. For example, if e=0, then the projected coordinates are a perfect match.

Moreover, in some embodiments step of applying 105 different vertical coordinates comprises applying 107 an optimization algorithm such that the best matching value is found (e.g. if several projected coordinates result in error values below the maximum error value). Moreover, the application 105 of different vertical coordinates 105 may be performed 108 sequentially as mentioned, or alternatively, in an optimized manner (e.g. omitting negative vertical coordinates if it can be assumed beforehand that one is looking for a positive vertical offset). Thereby, computational time may be reduced and the overall algorithm rendered more computationally efficient.

Moving back to FIG. 1, the method 100 further comprises determining 106 the vertical offset, of the subject piece of the road segment, based on the applied vertical coordinate that satisfied the defined mathematical function with the maximum error value and the obtained vehicle movement data. Furthermore, the method 100 may comprise forming 107 an updated representation of the one or more road reference based on the determined vertical offset. Thus, once the vertical offset is known, the image distortion caused by the vertical curvature of the road ahead (the curvature may be positive or negative), can be used to compensate the previously erroneous representation of the road reference(s) (e.g. the lane trace).

Executable instructions for performing these functions are, optionally, included in a non-transitory computer-readable storage medium or other computer program product configured for execution by one or more processors.

Figure 3:
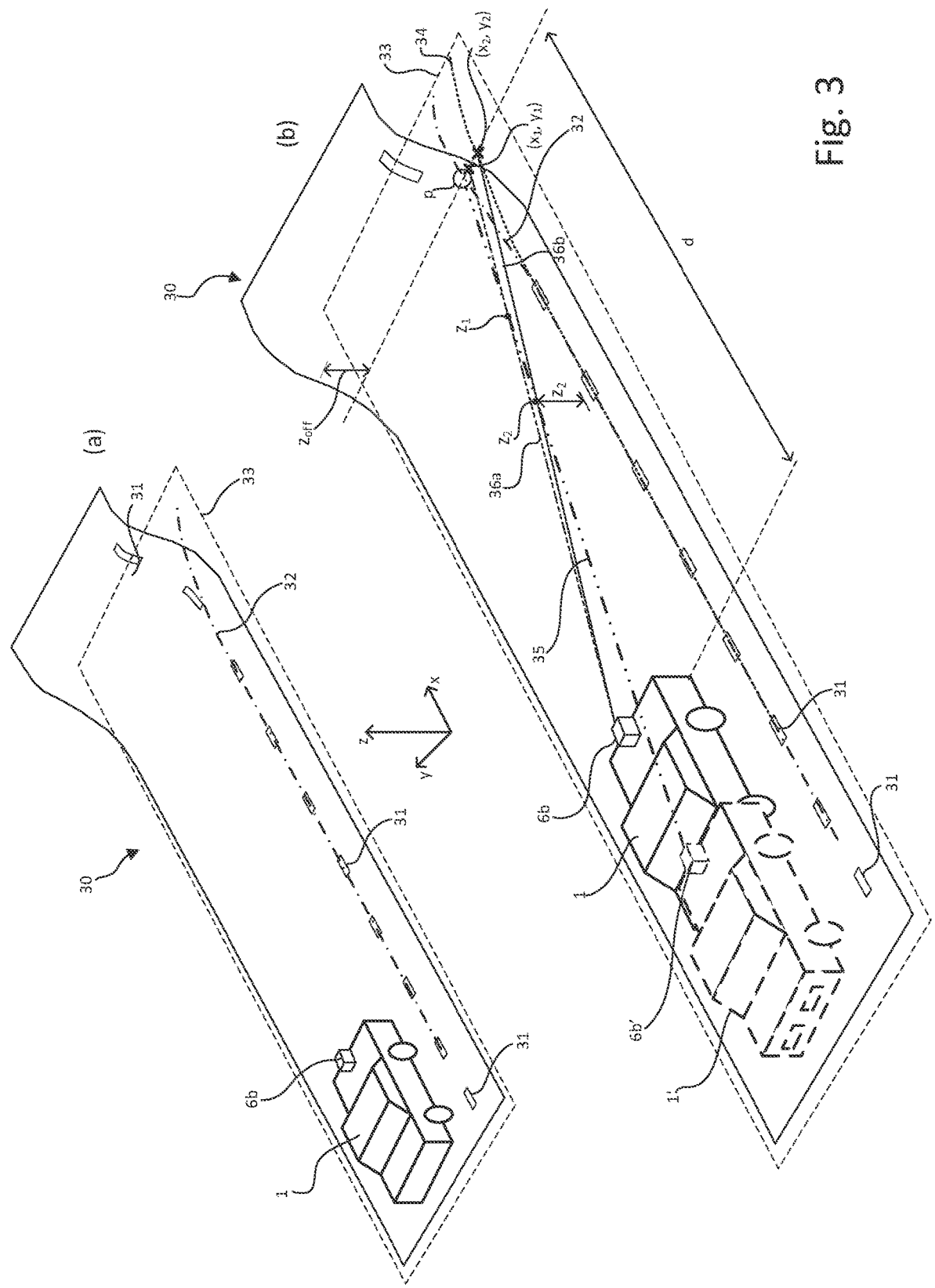
FIG. 3 is a schematic perspective view illustration of a vehicle having a control device for estimating a vertical offset of a road segment for a vehicle in accordance with an embodiment of the present disclosure.

FIG. 3 is a schematic perspective view illustration of a vehicle 1 traveling on a road segment 30, where the vehicle 1 has a control device for estimating a vertical offset (zoff) for an ADS feature of the vehicle 1. In more detail, FIG. 3 further elucidate the above-discussed method and shows the vehicle 1 traveling on the road segment 30 at a first moment in time (t−1) in part (a), and the same vehicle 1 on the same road segment 30 at a second (subsequent) moment in time (t0) in part (b).

In more detail, FIG. 3(a) shows a vehicle 1 traveling on a road segment 30 where the road curves upwards at a distance in front of the vehicle 1. The vehicle 1 is equipped with a camera 6b whose output is used to track or trace a road reference, here in the form of right-side lane markers 31, in order to form a first representation 32 of the lane markers 31 in the vehicle plane 33. Due to the upwards curving road segment 30 ahead, some distortion is induced, causing the lane trace representation 32 to curve outwards as the road ahead curves upwards. Thus, an erroneous representation 32 of the right-side lane markers is formed. The erroneous representation 32 may negatively affect any ADS feature relying upon correct lane traces, and may result in a suppression of features or unreliable operation.

In more detail, a lane tracking feature will bend outwards for road portions slanting upwards and bend inwards for road portions slanting downwards due to distortion effects. This distortion may accordingly create problems for e.g. a Lane Keeping Assist (LKA) feature. Line estimations bending inwards tend to suppress the LKA because of the narrow space between the lines leaving to little room for the vehicle, while line estimations bending outwards may instead result in a non-reliable function with more estimated room between the lines than true.

However, if the vertical offset of the road ahead would be known, the algorithm or module generating the lane trace 32 could be configured to take the vertical offset into account in order to compensate for the image distortion caused by the vertical curvature of the road, and the overall road safety for autonomous vehicles can be improved.

FIG. 3(b) shows the vehicle 1 traveling on the same road segment but at a subsequent moment in time, where the position of the vehicle at the previous moment in time (FIG. 3(a)) is indicated by the broken contours of the vehicle 1' and image sensor 6b'.

Moving on, the vehicle 1 has a control device (not shown) comprising control circuitry configured to track a road reference 31 on the road segment 30 by means of an image sensor 6b at a first moment in time (Li) from a first observation point in order to form a first representation 32 of the road reference 31 in an vehicle plane 33. The first representation is based on a first mathematical function (e.g. a third order polynomial). Moreover, tracking a road reference "by means" of an image sensor 6b is in the present context to be interpreted broadly, and may simply mean that the image sensor output is used to generate the road reference representation 32.

Further, the control circuitry is configured to obtain vehicle movement data from at least one motion sensor of the vehicle 1 over a time period extending from the first moment in time ($t_1$) to a second moment in time ($t_0$). Motion sensor is herein to be interpreted broadly and includes any type of sensor capable of generating an output indicative of a movement of the vehicle 1, such as e.g. accelerometers, gyroscopes, wheel spin counters, strain gauges, GNSS devices, etc.

Further, the control circuitry of the control device is configured to track the same road reference(s) 31 by means of the (same) image sensor 6b at the second moment in time (t0) from a second observation point in order to form a second representation 34 of the road reference(s) 31 in the vehicle plane 33. The second representation is based on a second mathematical function. As shown in illustration (b) of FIG. 3, the second representation 34 is also affected by the distortion caused by the curvature of the road portion ahead of the vehicle 1. In other words, the control circuitry is configured to track/trace a road reference 31 (and build the representation 32, 34) in two sequential image frames while monitoring the vehicle's 1 movement between these two frames.

Further, the control circuitry is configured to transform a point (p) of the first representation from a coordinate system of the first representation to a coordinate system of the second representation based on the obtained movement data. In other words, the point (p) is transformed from a coordinate system of the first frame (illustrated in (a)) to a coordinate system of the second frame (illustrated in (b)). In more detail, control circuitry may be configured such that one or more points of the first representation 32 is dead reckoned and transformed to the second frame, whereby an arbitrary point of the dead reckoned first representation 32 may be selected for processing.

The vehicle plane 33 does not necessarily have to be the same plane in both frames (i.e. in both $t_{-1}$ and $t_0$), as long as one can transform an arbitrarily selected point (p) from the coordinate system of the first representation 32 to the coordinate system (including the vehicle plane 33 in the second frame) of the second representation 34.

Once the point (p) has been transformed, the control circuitry is further configured to apply a vertical coordinate ($z_1$; $z_2$; . . . ) on the transformed point so to calculate a set of projected longitudinal and lateral coordinate ($x_i$, $y_i$) that satisfy the second mathematical function ($Y(x)_{r0}=y$) and a maximum error value ($e_{max}$). More specifically, the arbitrarily selected point (p) is translated along a first axis 35 extending from the first observation point (i.e. from the image sensor 6b' as positioned in the first moment in time but represented in the coordinate system of the coordinate system of the second frame) through the transformed point (p).

Once, the transformed point (p) has been translated along the first axis 35 based on the vertical coordinate, it is projected back onto the vehicle plane 33 along a second axis extending through the now translated point and the second observation point (i.e. through the image sensor's 6b position in the second moment in time). The process of applying a vertical coordinate on the transformed point in order to calculate the set of projected longitudinal and lateral coordinates will now be described in more detail in reference to the illustrated exemplary embodiment.

As illustrated in FIG. 3(b), a first vertical coordinate $z_1$ is applied and tested whereby the transformed point (p) is moved along the first axis 35 towards the first observation point 6b'. Then, the translated point (indicated by $z_1$) is projected onto the vehicle plane 33 along a second axis 36a extending through the translated point and the second observation point. Accordingly, the second axis 36a will intersect the vehicle plane 33 at the projected longitudinal and lateral coordinates ($x_1$, $y_1$). Next, a check is performed to see if the projected coordinates ($x_1$, $y_1$) satisfy the mathematical function $Y(x)_{t0}$, by using e.g. the longitudinal coordinate $x_1$ as input to the function and comparing the result $Y(x_1)_{t0} = y_{test1}$ with the projected lateral coordinate $y_1$, as indicated in the drawing $y_1 \neq y_{test1}$, and more specifically, $y_1 - y_{test1} = e_1 > e_{max}$. Thus, the tested vertical coordinate $z_1$ is wrong.

Accordingly, the algorithm moves on and tests a different vertical coordinate $z_2$ and projects this point back onto the vehicle plane 33 via a second axis 36b running through the second observation point and the vertical coordinate $z_2$. Analogously as before, the projection on the vehicle plane results in a new set of longitudinal and lateral coordinates ($x_2$, $y_2$), which are tested against the defined mathematical function $Y(x_1)_{t0} = y_{test2}$; $y_2 - y_{test2} = e_2 < e_{max}$. As illustrated in FIG. 3(b), the second set of projected coordinates "align" with the second representation 34 well enough (the error ($e_2$) is less than the maximum error value). Thus, the associated vertical coordinate $z_2$ is used to determine the vertical offset $z_{off}$ of the road portion ahead. More specifically, the vertical offset $z_{off}$ is determined at a distance (d) from the vehicle 1 defined by a longitudinal separation between a reference point of the vehicle 1 (e.g. position of the camera 6b) and the transformed point (p).

Thus, at a sufficiently high sample rate, it is possible to compute the vertical curvature of the road in front of the vehicle with a relatively high resolution (centimetre or decimetre resolution), depending on the speed of the vehicle 1. Alternatively, or additionally, one can transform a plurality of points from the first representation in order to compute the vertical curvature of the road in front of the vehicle with a resolution independent of the speed of the vehicle.

Moreover, the determination of the vertical offset $z_{off}$ may further comprise scaling the vertical coordinate $z_2$ that satisfied the mathematical function and the maximum error value based on the obtained movement data. For example, if one is trying to determine the vertical offset at a distance of thirty meters ahead of the vehicle 1, and the vehicle 1 has moved one meter between the first moment in time ($t_{-1}$) and the second moment in time ($t_0$); then it may be necessary to scale up the vertical coordinate 30 times in order to obtain the a more accurate vertical offset $z_{off}$.

As the skilled person in the art readily understands, the same principles are analogously applicable for road portions having a negative vertical offset (i.e. which are sloping downwards). Therefore, for the sake of brevity and conciseness, the corresponding scenario for a negative slope will not be further discussed.

Furthermore, in some embodiments, the control circuitry of the control device may be configured to aggregate a plurality of vertical offsets $t_{off}$ over time. These aggregated vertical offsets can then be used to define a vertical error of the image sensor 6b. In more detail, for a sufficiently long enough road the aggregated results should sum up to approximately zero, since roads are assumed to go up and down by equal amounts for a sufficiently long sample. However, it was realized by the present inventor that this may not be the case, and if so it means that the vertical error of the defined "infinity point" used by the image sensor 6b may be wrong. Thus, the aggregated data may be used to correctly re-define this vertical error. This may be advantageous for any ADS feature in the vehicle that uses the data output of the image sensor 6b for monitoring stationary and moving objects in the surrounding environment of the vehicle.

Still further, in some embodiments, the control circuitry may be configured to track two road references 31 that are laterally separated on the road segment 30, such as for example left and right lane markers. Then, by using the above described process for estimating the vertical offset from each of the two separate road references, the control circuitry may be configured to determine a tilt angle of the road segment based on a comparison of the two vertical offsets. In more detail, the control circuitry may be configured to compare the two determined vertical offsets, and if they differ, the control circuitry may be configured to determine that the road portion ahead of the vehicle is tilting. For example, the left lane trace may result in a vertical offset of 1.0 meters while the right lane trace may result in a vertical offset of 0.8 meters. Thus, it can be concluded that the road is sloping to the right.

Moreover, analogously as described before, the vertical offsets for the two laterally spaced road reference representations may be aggregated over time, and used to determine if a horizontal offset (vertical errors across the image) of the image sensor 6b is erroneously tilting to the left or right.

In summary, the present inventor realized that by using information readily available in current road reference tracing or road reference tracking features (e.g. lane tracing features), an accurate and reliable method and control device for estimating the vertical curvature of the road ahead can be provided. In more detail, it was realized that by using the information provided from two different road reference representations in two different frames, it is possible to compute the vertical offset of a road portion without having to select a specific point and searching for a matching specific points. Instead, an arbitrarily selected point can be used rendering the proposed method more dynamic and efficient than other currently known methods for estimating the vertical curvature/offset of the road in front of a vehicle.

Figure 4:
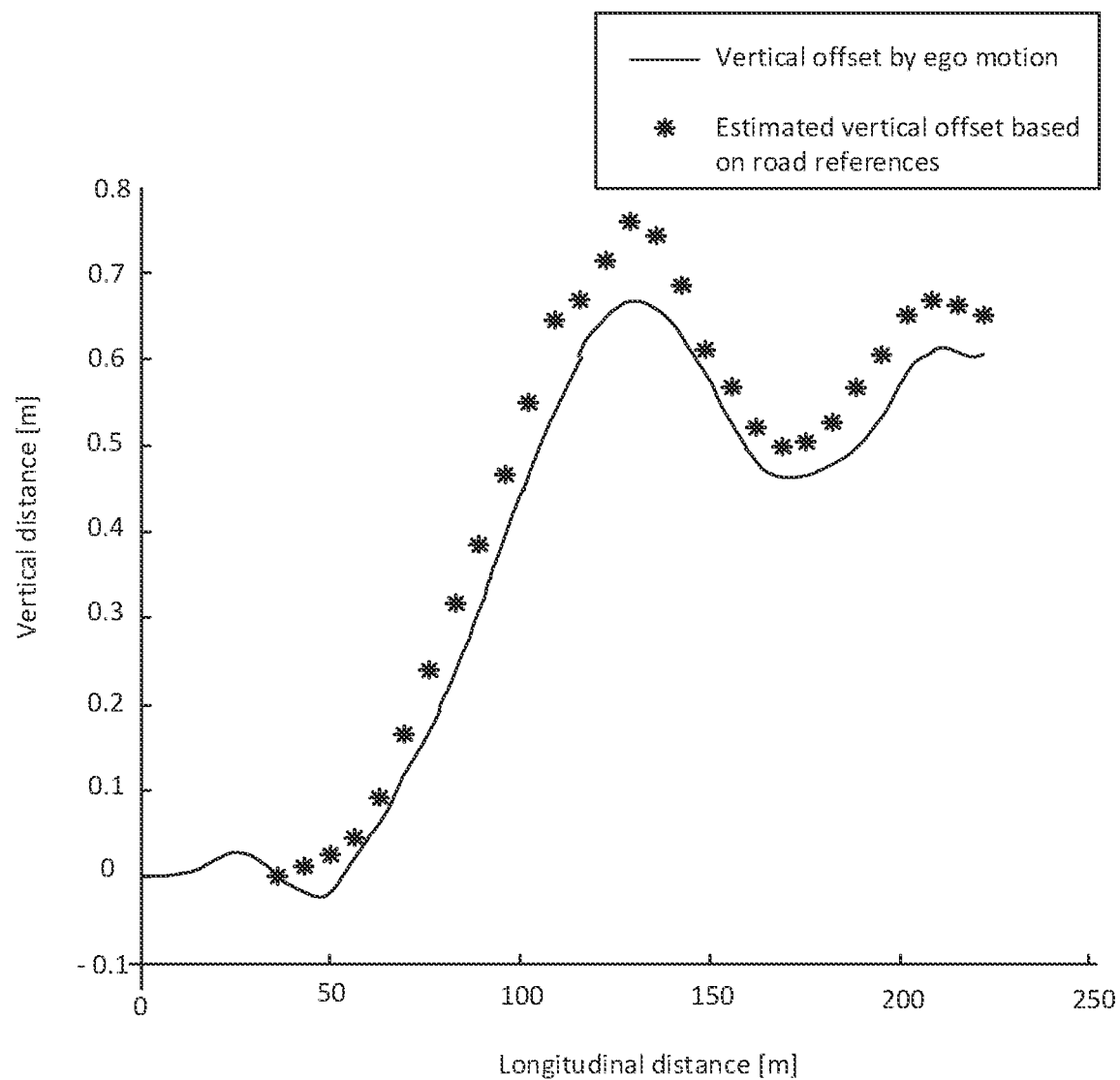
FIG. 4 is a schematic plot illustrating the results of an application of a method for estimating a vertical offset of a road segment for a vehicle in accordance with an embodiment of the present disclosure.

FIG. 4 is a schematic plot illustrating a test-log of the above proposed method based on actual vehicle data, where the estimated vertical offset of the road is represented by the points, and the vertical offset (as detected by the vehicle's IMU) is represented by the line. Thus, as indicated by the plot, the herein proposed solution for estimating a vertical offset of a road portion in front of the vehicle provides a relatively reliable and accurate result.

In more detail, the points in the graph illustrate how the "estimated" vertical offset based on the method is determined at a distance in front of the vehicle while the line represents the vertical offset based on motion sensor data as the vehicle moves along the road portion. The small errors in the correlation between the estimated offset and the vertical offset based on motion sensor data does not necessarily imply that the estimated vertical offset is erroneous since the motion sensor data is inherently prone to noise and bias errors. Moreover, since the plot is only based on one road reference, any lean (i.e. roll rate) will also negatively affect the vertical offset determination made by the motion sensor(s).

Figure 5:
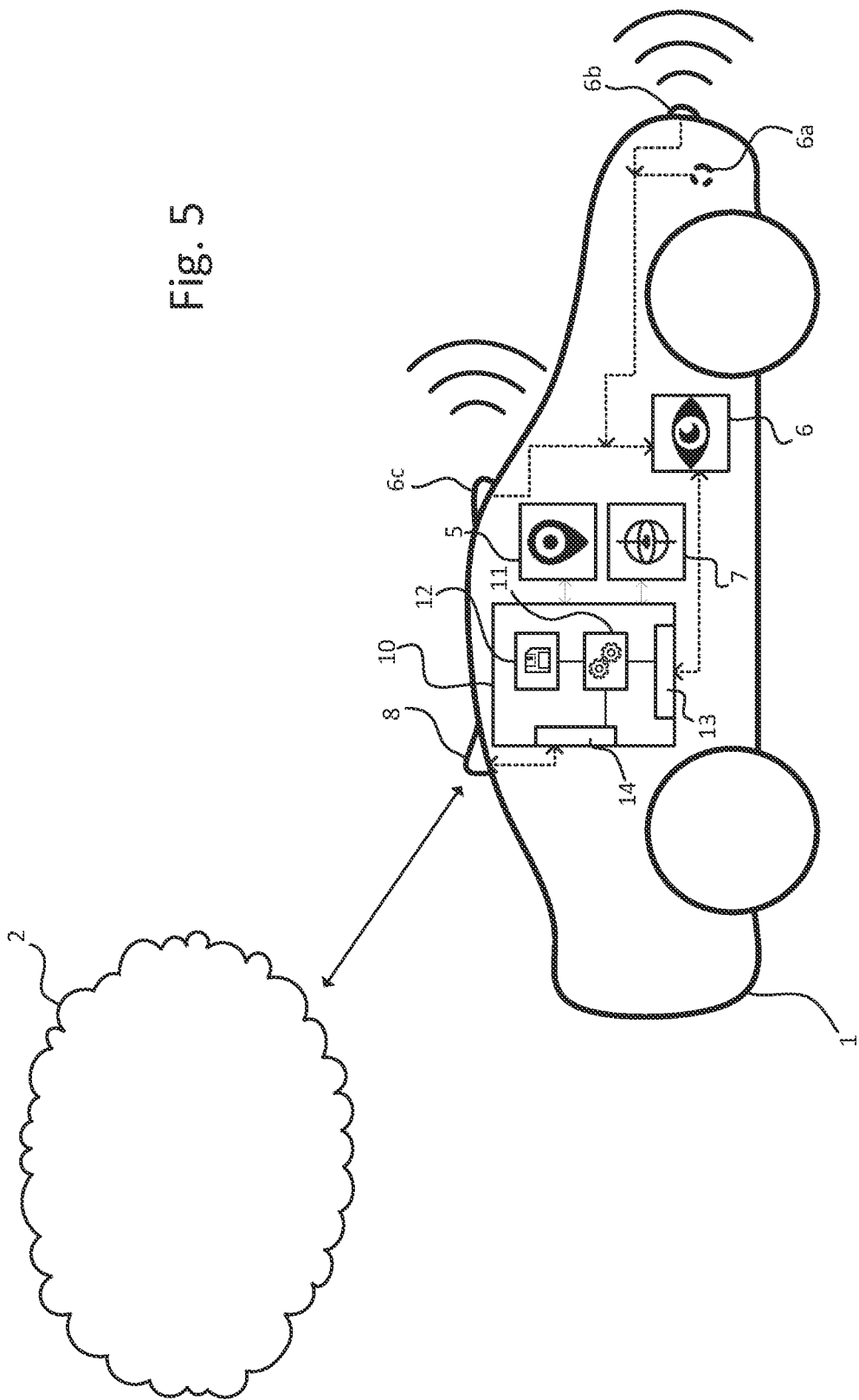
FIG. 5 is a schematic side view of a vehicle having a control for estimating a vertical offset of a road segment for a vehicle in accordance with an embodiment of the present disclosure.

FIG. 5 is a schematic side view of a vehicle 1 comprising a control device 10 for estimating a vertical offset of a road segment for an ADS feature of the vehicle 1. The vehicle 1 further comprises a perception system 6, an IMU 7, and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. An IMU 7 is to be understood as an electronic device configured to measure the inertial movement of the vehicle 1. An IMU 7 usually has six degrees of freedom, three accelerometers and three gyroscopes. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for estimating a vertical offset of a road segment that the vehicle 1 is traveling upon in accordance with any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the vehicle 1 may be connected to external network(s) 2 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the pre-defined behaviour model. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A method for estimating a vertical offset of a road segment for a vehicle, the method comprising:
   tracking at least one road reference on the road segment at a first moment in time from a first observation point in order to form a first representation of the at least one road reference in a vehicle plane, and wherein the first representation is based on a first mathematical function;
   obtaining vehicle movement data over a time period extending from the first moment in time to a second moment in time;
   tracking the at least one road reference on the road segment at the second moment in time from a second observation point in order to form a second representation of the at least one road reference in the vehicle plane, and wherein the second representation is based on a second mathematical function;
   transforming a point of the first representation from a coordinate system of the first representation to a coordinate system of the second representation based on the obtained movement data;
   applying a vertical coordinate on the transformed point so to calculate a set of projected longitudinal and lateral coordinates that satisfy the second mathematical function and a maximum error value; and
   determining the vertical offset based on the applied vertical coordinate that satisfied the second mathematical function with the maximum error value and on the obtained vehicle movement data.

2. The method according to claim 1, further comprising:
   forming an updated representation of the at least one road reference based on the determined vertical offset.

3. The method according to claim 1, wherein the vertical offset is determined at a distance from the vehicle defined by a longitudinal separation between the vehicle and the point in the first representation.

4. The method according to claim 1, wherein determining the vertical offset comprises scaling the vertical coordinate that satisfied the second mathematical function and the maximum error value based on the obtained vehicle movement data.

5. The method according to claim 1, wherein applying the vertical coordinate comprises:
   sequentially applying different vertical coordinates in order to translate the transformed point and calculate different sets of projected longitudinal and lateral coordinates in the vehicle plane; and
   applying an optimization algorithm to determine the set of projected longitudinal and lateral coordinate that satisfy the defined mathematical function with the maximum error value.

6. The method according to claim 5, wherein sequentially applying different vertical coordinates comprises:
   translating the transformed point along a first axis extending from the first observation point through the transformed point; and
   projecting the translated point on the image plane along a second axis extending through the translated point and the second observation point, wherein the second axis intersects the vehicle plane at the set of projected longitudinal and lateral coordinates.

7. The method according to claim 1, wherein the at least one road reference is at least one lane marker, and the representation of the at least one road reference is at least one lane trace.

8. The method according to claim 1, wherein the at least one road reference is at least one road boundary, and the representation of the at least one road reference is at least one road boundary trace.

9. The method according to claim 1, wherein the vehicle movement data comprises one or more of a vehicle speed, a vehicle acceleration, a vehicle yaw rate, a vehicle pitch rate, and a vehicle roll rate.

10. The method according to claim 1, wherein the first representation and the second representation are based on sensor data from an image sensor of the vehicle.

11. The method according to claim 10, further comprising:
    aggregating a plurality of vertical offsets over time; and
    defining a horizontal offset of the image sensor based on the aggregated plurality of vertical offsets.

12. The method according to claim 1, wherein the at least one road reference comprises two road references that are laterally separated on the road segment, and wherein the method further comprises:
    comparing the determined vertical offset of the two road references; and
    determining a tilt angle of the road segment based on the comparison.

13. A non-transitory computer-readable storage medium storing one or more instructions which, when executed by one or more processors of a processing system, cause the one or more processors to carry out a method for estimating a vertical offset of a road segment for a vehicle, the method comprising:

tracking at least one road reference on the road segment at a first moment in time from a first observation point in order to form a first representation of the at least one road reference in a vehicle plane, and wherein the first representation is based on a first mathematical function;

obtaining vehicle movement data over a time period extending from the first moment in time to a second moment in time;

tracking the at least one road reference on the road segment at the second moment in time from a second observation point in order to form a second representation of the at least one road reference in the vehicle plane, and wherein the second representation is based on a second mathematical function;

transforming a point of the first representation from a coordinate system of the first representation to a coordinate system of the second representation based on the obtained movement data;

applying a vertical coordinate on the transformed point so to calculate a set of projected longitudinal and lateral coordinates that satisfy the second mathematical function and a maximum error value; and determining the vertical offset based on the applied vertical coordinate that satisfied the second mathematical function with the maximum error value and on the obtained vehicle movement data.

14. A control device for estimating a vertical offset of a road segment for a vehicle, the control device comprising:
a control circuitry configured to:
track a road reference on the road segment by an image sensor at a first moment in time from a first observation point in order to form a first representation of the road reference in a vehicle plane, and wherein the first representation is based on a first mathematical function;

obtain vehicle movement data from at least one motion sensor of the vehicle over a time period extending from the first moment in time to a second moment in time;

track the road reference on the road segment by the image sensor at the second moment in time from a second observation point in order to form a second representation of the road reference in the vehicle plane, and wherein the second representation is based on a second mathematical function;

transform a point of the first representation from a coordinate system of the first representation to a coordinate system of the second representation based on the obtained movement data;

apply a vertical coordinate on the transformed point so to calculate a set of projected longitudinal and lateral coordinates that satisfy the second mathematical function and a maximum error value; and determine the vertical offset based on the applied vertical coordinate that satisfied the second mathematical function and the maximum error value and on the obtained vehicle movement data.

15. A vehicle comprising:
an image sensor for monitoring a surrounding area of the vehicle;
at least one motion sensor for generating vehicle movement data; and
a control device according to claim 14.

* * * * *